United States Patent
Takemura et al.

(10) Patent No.: US 6,409,846 B1
(45) Date of Patent: Jun. 25, 2002

(54) ROLLING BEARING

(75) Inventors: Hiromichi Takemura; Susumu Tanaka; Shigeru Okita, all of Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/527,245

(22) Filed: Mar. 17, 2000

(30) Foreign Application Priority Data

Mar. 19, 1999 (JP) .............................. 11-076745
Dec. 28, 1999 (JP) .............................. 11-375661

(51) Int. Cl.[7] .................. C22C 38/22; C22C 38/24; C22C 38/18
(52) U.S. Cl. .................. 148/325; 148/326; 148/906; 384/625; 384/912
(58) Field of Search .................. 148/906, 325, 148/326; 384/326, 625, 912

(56) References Cited

U.S. PATENT DOCUMENTS 5,998,042 A * 12/1999 Tanaka et al. .............. 428/627
6,143,425 A * 11/2000 Tanaka et al. .............. 428/627

FOREIGN PATENT DOCUMENTS

| DE | 39 01 470 C1 | 8/1990 | ............ C22C/38/22 |
| DE | 693 13 740 T2 | 1/1994 | ........ C10M/169/02 |
| DE | 694 13 632 T2 | 2/1995 | ............ C22C/38/22 |
| DE | 195 38 658 A1 | 4/1996 | ........ C10M/169/02 |
| DE | 197 07 033 A1 | 11/1997 | ............ C21D/9/40 |
| EP | 0 592 195 A1 | 4/1994 | ............ F16C/33/62 |
| JP | 08183976 A | * 7/1996 | |

* cited by examiner

Primary Examiner—Deborah Yee
(74) Attorney, Agent, or Firm—Sughrue Mion, PLLC

(57) ABSTRACT

In a rolling bearing having a fixed race, a rotary race and a plurality of rolling elements disposed between said fixed race and said rotary race, at least said fixed race is made of a steel having 0.35 to 0.55% by weight of C, 11.0 to 17.0% by weight of Cr, 0.05 to less than 0.2% by weight of N and the rest of Fe and unavoidable components. Further, the sum of the content of C and N is from 0.45 to 0.65% by weight or less, and exhibits a surface hardness HRC of 57 or more after heat treatment and the diameter of eutectic carbide produced on said bearing races is 10 $\mu$m or less.

10 Claims, 1 Drawing Sheet

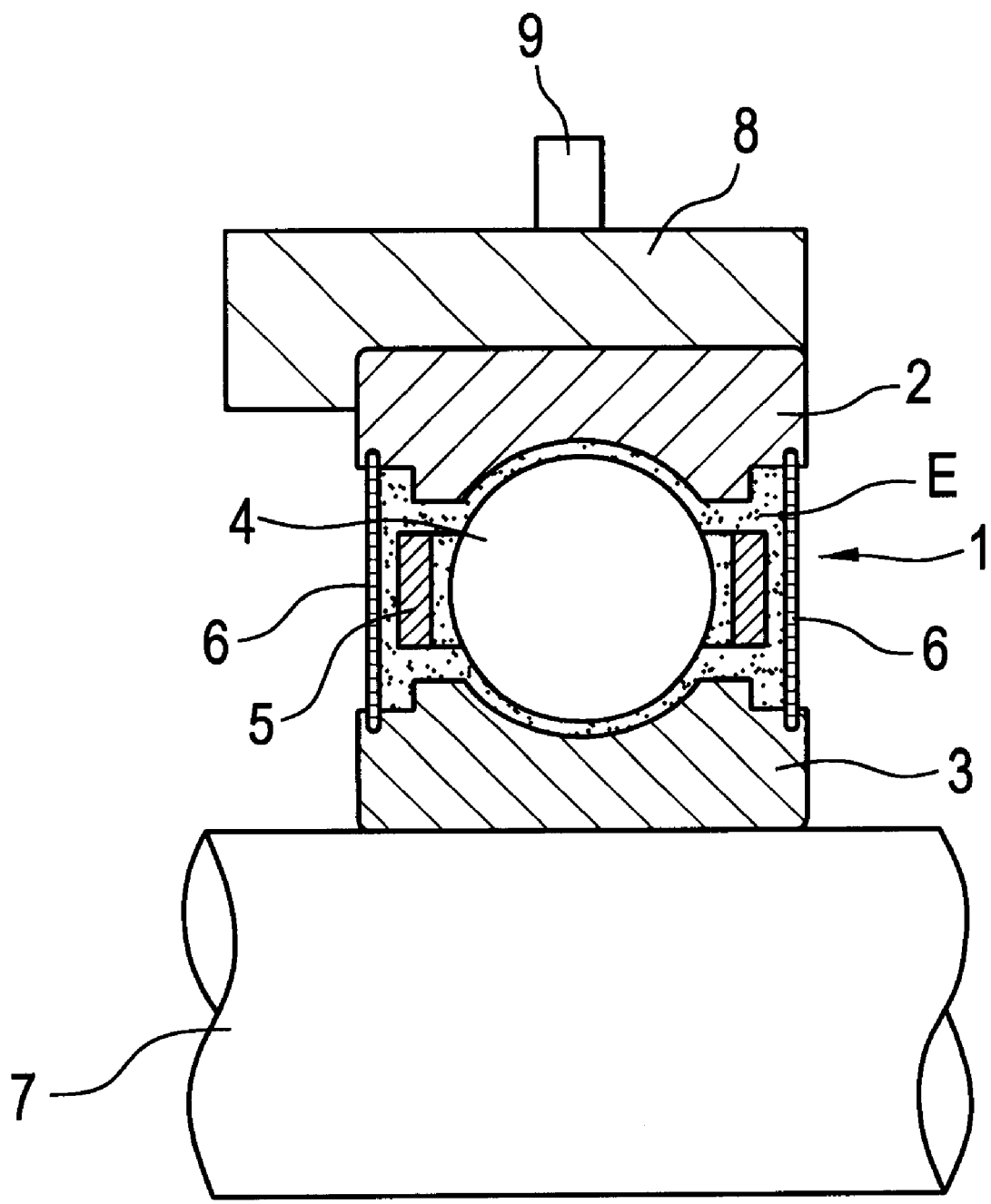

ROLLING BEARING

BACKGROUND OF THE INVENTION

1. Field of the Invention

The present invention relates to a rolling bearing. More particularly, the present invention relates to a rolling bearing for engine auxiliary machinery (alternator, magnetic clutch, compressor, intermediate pulley, water pump) which is used in an environment where the contamination with water makes it difficult to form a lubricant film.

2. Description of the Related Art

In recent years, with the reduction of the size and weight of automobiles, engine auxiliary machinery having a reduced size and weight as well as higher performance and output has been required. Accordingly, when the engine is actuated, the bearing, e.g., for alternator is simultaneously acted upon by high vibration and high load (about 4 to 20 G as calculated in terms of acceleration of gravity) accompanying high speed rotation through the belt. As a result, the outer bearing race as fixed race suffers early flaking that causes the reduction of-bearing life.

The early flaking is attributed to the rise in stress due to high vibration or the resulting difficulty in the formation of lubricant film that causes the decomposition of water content present in an amount of about 0.1% in the grease and hence makes it easy for surface contact to occur.

As a case where a rolling bearing is contaminated with water to show a reduced life there is disclosed in J. A. Cirura et al., "Wear, 24 (1973) 107–118, The Effect of Hydrogen on the Rolling Contact Fatigue Life of AISI 52100 and 440C Steel Balls" that a four-ball rolling test with a lubricant contaminated with water shows the reduction of life to one tenth of the initial value and a rolling fatigue test on a hydrogen-charged steel ball shows that stainless steel ball (SUS440C) has a longer life than ball made of bearing steel of the second kind.

However, the use of SUS440C as a bearing material for the purpose of prolonging the bearing life is disadvantageous in that SUS440C can hardly be worked as compared with the bearing steel of the second kind and forms on the rolling surface an eutectic carbide having a size of more than 10 μm that adversely affects the rolling life and acoustic properties of the bearing, making it difficult to put SUS440C to practical use.

As a technique for prolonging the life of rolling bearings, e.g., for the foregoing engine auxiliary machinery, to be used with high vibration under high load there is disclosed a grease-filled bearing made of martensite stainless steel in at least a fixed race and 14% or 18% Cr-based high carbon stainless steel as in JP-A-3-173747 (The term "JP-A" as used herein means an "unexamined published Japanese patent application").

Further, there is disclosed, among grease-filled bearing races, a rolling bearing made of steel containing from 1.5 to 6% of Cr in at least the fixed bearing race as in JP-A-5-26244.

As a countermeasure against early flaking there is disclosed in "SAE Technical Paper: SAE950944 (held on February 27 to Mar. 2, 1995)", Articles 1 to 14, a technique resulting from the elucidation of the fatigue mechanism of bearing for alternator which comprises changing the filling grease from E grease to M grease having a high damping effect from which a lubricant film that can sufficiently absorb high vibration and high load is formed to prevent the rolling elements and the bearing races from coming in metallic contact with each other and hence early flaking.

In recent years, however, the development of small-sized high output alternators has been under way. This has caused the rise in the working temperature at which the bearings must be used to higher than 150° C. Accordingly, even the improved M grease occasionally can hardly form a lubricant film. Further, since there occurs a great difference in environmental temperature, dew condensation can easily take place in the bearing, occasionally contaminating the interior of the bearing with water.

The bearing disclosed in the former of the foregoing citations (JP-A-3-173747) comprises 13Cr-0.7C steel which is a martensite stainless steel having a tempered martensite structure, 18Cr-1%C SUS440C or SUS420J2, which is 13Cr-0.3C steel, from which a passive film is formed to exhibit an enhanced resistance to hydrogen embrittlement. However, SUS420J2 is disadvantageous in that it exhibits HRC of 52, which is not high enough against rolling fatigue. SUS440A and SUS440C are disadvantageous in that they have a C content of more than 0.6% that causes the deposition of coarse eutectic carbide particles having a size of more than 10 μm on the rolling surface. As a result, surface-starting flaking takes place. At the same time, the passive film can easily break, deteriorating the corrosion resistance of the bearing. Further, the use of these steel materials are disadvantageous in that it deteriorates the workability in the production of bearing.

Further, the bearing disclosed in the latter of the foregoing citations (JP-A-5-26244) comprises from 1.5 to 6% of Cr incorporated at least in the fixed race, thereby forming on the surface of the bearing races an oxidized Cr film that inactivates the rolling surface and hence making it possible to prevent the decomposition of grease resulting in the production of hydrogen that then contaminates the interior of the bearing. As disclosed in "Nihon Tripology Kaigi Yokoshu (Preprint of Japan Council of Tripology) (Tokyo, 1995-5)", pp. 551–554, however, a bearing for engine auxiliary machinery is liable to rotational slippage of rolling elements on the inlet side of the load zone of the fixed race. Thus, the oxidized Cr film ($FeCrO_4$), which can be formed from a composition having a Cr content of from about 1.5 to 5%, can be easily cut when its thickness is from about 1 to 2 nm. Further, since the outer race, which is liable to frequent early flaking, is subject to direct application of load, the outer race cannot be prevented against early flaking.

Further, austenite steel such as SUS304 and SUS316, which exhibit a good acid resistance, lacks sufficient hardness, which is the most important factor for rolling bearing, and thus cannot be applied to bearing for engine auxiliary machinery, which is subject to high vibration and high pressure.

As described in WEAR199 (1996) 245–252 "Occurrence of brittle flaking on bearing used for automotive electrical instruments and auxiliary device", on the other hand, Tamada et al. reports that when subjected to linear contact rolling fatigue test on a test specimen which has been subjected to hydrogen charge test, a 13% Cr stainless steel test specimen undergoes structure whitening and breakage at the maximum shear stress generating position, suggesting that hydrogen embrittlement cannot be completely prevented.

SUMMARY OF THE INVENTION

Through studies of the mechanism of breakage of these 13%Cr stainless steels, the inventors found that the passive film does not prevent the penetration of hydrogen as has been heretofore insisted but the principle of adsorption of hydrogen atom by the passive film, i.e., mechanism that the amount of hydrogen adsorbed by the material itself increases but the penetration of hydrogen into the interior of the bearing, i.e., the maximum shear stress generating position can be prevented exerts the best effect of prolonging the bearing life.

It was also found that the material which can only form a passive film having a thickness as insufficient as from 1 to 2 nm and SUS440C, which forms an eutectic carbide having a size of 10 μm on the surface of bearing, exert an adverse effect of easily allowing hydrogen atom thus adsorbed to penetrate into the interior of the bearing.

The present invention has been worked out on the basis of the foregoing knowledge. An object of the invention is to provide a rolling bearing which comprises a dense passive film on the race surface to a uniform thickness of from 5 to 100 nm to allow the surface layer to adsorb hydrogen atom, thereby preventing water from penetrating into the maximum shear stress generating position, comprises carbon and nitrogen incorporated in the material composition according to a specified relationship to enhance the abrasion resistance of the passive film, thereby preventing film breakage, and comprises carbon and chromium incorporated therein according to a specified relationship to reduce the rolling life or prevent the production of a large amount of coarse eutectic carbide particles having a size of 10 μm or more that hinders the uniform formation of passive film, thereby fairly preventing early flaking even under severe working conditions where the bearing is subject to high temperature and vibration and contamination with water and hence prolonging the life thereof.

In order to accomplish the foregoing object of the invention, the rolling bearing according to the invention comprises a plurality of rolling elements disposed between a fixed race and a rotary race, wherein at least the fixed race is made of a steel comprising from 0.35 to 0.55% by weight of C, from 11.0 to 17.0% by weight of Cr, from 0.05 to less than 0.2% by weight of N and the rest of Fe and unavoidable components, with the proviso that the sum of the content of C and N is from 0.45% by weight to 0.65% by weight, and exhibits a surface hardness HRC of 57 or more after heat treatment and the diameter of eutectic carbide produced on the bearing races is 10 μm.

Preferably, the rolling bearing comprising a plurality of rolling elements disposed between a fixed race and a rotary race, wherein at least the fixed race is made of a steel comprising from 0.35 to 0.55% by weight of C, from 11.0 to 17.0% by weight of Cr, from 0.05 to less than 0.2% by weight of N, from 0.2 to 1.0% by weight of Mn, from 0.2 to 1.5% by weight of Si and the rest of Fe and unavoidable components, with the proviso that the sum of the content of C and N is from 0.45% by weight or more to 0.65% by weight or less, which has been hardened, and then tempered at a temperature of from 400° C. to 550° C. to allow fine carbide particles having a size of from 50 to 300 nm to be secondarily deposited on the rolling surface so that the resulting surface hardness HRC is 57 or more, the diameter of eutectic carbide particles produced on the bearing race is 5 μm or less and the amount of retained austenite is 6% or less.

More preferably, in the foregoing rolling bearing, the space in the bearing is filled with a urea-based grease made of a synthetic oil comprising 50% or more of ether oil as a base oil. In this arrangement, even under high vibration, the lubricity retention can be kept good, making it possible to inhibit the decomposition of water in the grease. Further, a high damping effect can be exerted. Accordingly, the passive film having a thickness of from 5 to 100 nm on the surface of bearing race can be fairly protected, making it possible to further prolong the rolling life.

BRIEF DESCRIPTION OF THE DRAWINGS

In the accompanying drawings:

FIGURE is an illustrative sectional view explaining an embodiment of the rolling bearing according to the invention.

DETAILED DESCRIPTION OF THE INVENTION

The reason for the restriction of the composition ratio of the invention will be described hereinafter. The term "%" as used herein is meant to indicate "% by weight".

C is an element for providing hardness required for a rolling bearing. In order to obtain HRC of 57 or more, it is necessary that the content of C be 0.35% or more. C is also an element for rendering the matrix martensitic to enhance the hardness after hardening and tempering. However, C is preferably used less from the standpoint of corrosion resistance. This is because when C is added in a large amount, it forms coarse eutectic carbide particles with Cr during steel making, making the concentration of Cr in the matrix insufficient and hence making it impossible to obtain sufficient corrosion resistance. Further, the addition of a large amount of C causes the deterioration of rolling life and toughness. This is the reason why the content of C is defined to be from 0.35 to 0.55%.

Cr is the most effective element for rendering steel corrosion resistant. When the content of Cr is 11.0% or more, a good corrosion resistance can be obtained, thereby forming a passive film having a thickness of 5 nm or more. On the other hand, when the content of Cr increases, the corrosion resistance can be further improved. However, when Cr is added in an amount more than required, δ-ferrite is produced to easily render the steel brittle, thereby deteriorating the toughness of the steel or remarkably deteriorating the workability of the steel. Accordingly, since the upper limit of the content of Cr at which a firm passive film having a thickness of 100 nm or less can be formed is 17%, the optimum range of Cr content is from 11.0 to 17.0%. Further, taking into account the strength of passive film or the fact that since an eutectic carbide may be easily produced depending on the carbon concentration, retained austenite is produced despite sub-zero treatment due to the addition of N in a certain amount and undissolved carbide, thereby lowering the hardness of the steel hardened, the content of Cr is preferably from 11.0 to 14.0%.

N acts to reinforce martensite and hence enhance the corrosion resistance of the steel similarly to C. N needs to be added in an amount of 0.05% or more, preferably 0.08% or more, to inhibit the formation of coarse primary eutectic carbide. Further, an element such as Cr, Mn, Mo and V acts to enhance the solubility of N. In ordinary steel making at atmospheric pressure, however, the solubility of N in during smelting is so small that N can be hardly added in an amount of 0.2% or more. The addition of N in an amount of 0.2% or more requires the use of a production facility operating in an atmosphere of high pressure nitrogen that adds to the cost. Further, when it is tried to add a large amount of N at atmospheric pressure, bubbles are produced during solidification, causing a large amount of N to be incorporated in ingot. Depending on the amount of N (0.2% or more), a large amount of retained austenite is produced, lowering the hardness of the steel hardened and hence reducing the bearing life. Accordingly, the content of N is defined to fall within the range of from 0.05 to less than 0.2%, preferably from 0.08 to 0.15%.

In order to reinforce the martensite structure and exert a secondary deposition effect, thereby providing a surface hardness HRC of 57 or more, the sum of the content of C and N needs to be 0.45% or more. Further, taking into account the fact that depending on some C, N and Cr concentrations, a large amount of retained austenite can be produced, occasionally making it impossible to obtain sufficient hardening hardness, and coarse eutectic carbide particles or δ-ferrite are produced, lowering the toughness of the steel, the upper limit of the sum of the content of C and N is 0.65%. Accordingly, the sum of the content of C and N is defined to be from 0.45 to 0.65%.

Si is an element for enhancing the delay in the structural change, the hardenability and the resistance to temper softening. When the content of Si falls below 0.2%, the resulting effect is not sufficient. On the contrary, when the content of Si exceeds 1.5%, the resulting steel exhibits a remarkably deteriorated workability. Accordingly, the content of Si is defined to be from 0.2 to 1.5%. Mn is an element necessary as a deoxidizer during steel making and needs to be added in an amount of 0.2% or more. When added in a large amount, Mn not only deteriorates the forgeability and cuttability of the steel but also deteriorates the corrosion resistance of the steel together with impurities such as S and P. Accordingly, the upper limit of the content of Mn is 1.0%.

Mo has an effect of remarkably enhancing the hardenability and resistance to temper softening. Mo also has an effect of retarding the structural change developed by rolling fatigue. Mo is an element for improving the corrosion resistance of the steel. However, when added excessively, Mo deteriorates the toughness and workability of the steel. Accordingly, the upper limit of the content of Mo is 3.0%.

V is an element for forming fine carbide and nitride particles. V also has an effect of inhibiting the formation of Cr carbides and nitrides and causing secondary deposition during tempering at a temperature of from 400° C. to 550° C. to enhance the hardness, thereby remarkably enhancing the strength of the steel. However, taking into account the cost and workability, the upper limit of the content of V is 2.0%.

Ni is an element for vigorously stabilizing austenite. Ni also acts to inhibit the production of δ-ferrite and enhance the toughness, corrosion resistance and acid resistance. Accordingly, it is preferred that Ni be selectively incorporated in the steel of the invention. The lower limit of the amount of Ni to be added herein is 0.05%, preferably 0.5%. When added in an amount more than required, Ni not only adds to the cost but also produces a large amount of retained austenite, occasionally making it impossible to obtain sufficient hardening hardness. Accordingly, the upper limit of the content of Ni is 3.5%.

Cu is an element for slightly stabilizing austenite similarly to Ni. Cu also acts to inhibit the production of δ-ferrite and enhance the toughness, corrosion resistance and acid resistance. Accordingly, it is preferred that Cu be selectively incorporated in the steel of the invention. The lower limit of the amount of Cu to be added herein is 0.05%, preferably 0.5%. When added in a large amount, Cu can cause hot tear at the hot forging during the production of bearing. Accordingly, the upper limit of the content of Cu is 3.0%.

The content of O is preferably 10 ppm or less to inhibit the production of an oxide-based inclusion that reduces the rolling life. For the same reason, the content of S and P are each preferably 0.02% or less.

Further, by allowing $M_{23}C_6$ carbide particles having a size of 10 μm or less to be dispersedly deposited in the steel, hydrogen atom can be trapped to inhibit the local concentration of maximum shear stress generating positions, making it possible to inhibit local hydrogen embrittlement in the interior of the material. In particular, it is preferred that $M_{23}C_6$ carbide particles having a size of 10 μm or less to be dispersedly deposited in the steel in a proportion of 10 or more per $mm^2$.

Embodiments of the implication of the invention will be described hereinafter.

In the Figure, the reference numeral 1 indicates a deep groove ball bearing for rotation of inner race. The bearing 1 comprises an outer race 2 fixed to a housing and an inner race 3 mounted on a shaft 7. A plurality of rolling elements 4 held by a retainer 5 are disposed interposed between the outer race 2 and the inner race 3. A seal member 5 is mounted outside the retainer 5 interposed between the outer race 2 and the inner race 3. The space defined by the seal members 6, 6 is filled with an E grease. As the shaft 7 rotates, the inner race 3 rotates, too. The vibration and load developed by the rotation of the shaft acts on the load zone of the outer race 2 through the inner race 3 and the rolling elements 4. The reference numeral 9 indicates an acceleration pickup.

The first example of implication of the present invention will be described hereinafter.

The chemical components of test materials used in the comparative examples are set forth in Table 1.

TABLE 1

| | | C | Cr | N | C + N | Si | Mn | Mo | V |
|---|---|---|---|---|---|---|---|---|---|
| Example No. | 1 | 0.35 | 12.0 | 0.20 | 0.55 | 1.01 | 0.51 | — | — |
| | 2 | 0.42 | 12.5 | 0.09 | 0.51 | 0.65 | 0.43 | — | — |
| | 3 | 0.40 | 17.0 | 0.05 | 0.45 | 0.43 | 0.65 | 0.50 | 0.50 |
| | 4 | 0.45 | 13.0 | 0.18 | 0.53 | 0.55 | 0.55 | — | — |
| | 5 | 0.55 | 11.0 | 0.10 | 0.65 | 0.42 | 0.98 | 3.0 | — |
| | 6 | 0.47 | 12.0 | 0.14 | 0.61 | 0.31 | 0.45 | 0.15 | 0.10 |
| Comparative Example No. | 1 | 1.05 | 1.5 | 0.10 | 1.15 | 0.45 | 0.38 | — | — |
| | 2 | 0.65 | 13.4 | 0.10 | 0.75 | 0.38 | 0.42 | — | — |
| | 3 | 0.28 | 18.8 | 0.12 | 0.40 | 0.21 | 0.31 | 0.25 | — |
| | 4 | 0.37 | 13.0 | 0.02 | 0.39 | 0.39 | 0.61 | 0.40 | — |
| | 5 | 0.48 | 14.3 | — | 0.48 | 0.55 | 0.44 | 0.35 | — |
| | 6 | 0.50 | 22.5 | 0.07 | 0.57 | 0.68 | 0.88 | 0.15 | — |
| | 7 | 0.35 | 7.3 | 0.11 | 0.46 | 0.34 | 0.47 | 1.25 | — |
| | 8 | 1.08 | 18.0 | — | 1.08 | 0.44 | 0.51 | 0.50 | — |

For the life test on the rolling bearings of Examples 1 to 6 and Comparative Examples 1 to 8, inner races and outer races were prepared from the materials set forth in Table 1. For the bearing races other than that of Comparative Example 1, the materials were each subjected to ordinary heat treatment, i.e., thermal hardening at a temperature of from 1,000° C. to 1,150° C., sub-zero treatment, and then tempering at a predetermined temperature. For the bearing race of Comparative Example 1, the material, which is SUJ2, was subjected to thermal hardening at a temperature of 850° C. and then tempering at a temperature of 250° C. to have surface hardness HRC of from 54 to 62, a surface roughness of from 0.01 to 0.04 μmRa and a retained austenite (γR) content of from 0.5 to 10%.

For all the rolling elements of Examples 1 to 6 and Comparative Examples 1 to 8, SUJ2 was used. In some detail, the material was subjected to ordinary heat treatment, i.e., thermal hardening at a temperature of 850° C., oil quenching and then tempering at a temperature of 250° C. to have a surface hardness HRC of from 57 to 61, a retained austenite (γR) content of 2% or less and a surface roughness of from 0.003 to 0.010 μmRa.

The life test on the rolling bearings of Examples 1 to 6 and Comparative Examples 1 to 8 will be described hereinafter.

As the testing machine there was used a bench rapid acceleration-deceleration testing machine which operates at a rotary speed that switches between 9,000 rpm and 18,000 rpm at a predetermined time interval (e.g., 9 seconds). For both the examples and comparative examples, the test bearing was prepared from JIS Model No. 6303. Referring to load conditions, P (load)/C (dynamic rated load) was 0.10. As the filling grease there was used an E grease. Referring to the testing temperature, the temperature of the atmosphere was invariably 150° C. The calculated lifetime of the bearing was 1,350 hours. Accordingly, the life test was terminated at 1,000 hours. Ten samples were tested for each of the examples and comparative examples (n=10).

Table 2 shows the results of the life test on the examples and comparative examples.

Accordingly, it is generally thought that these bearings have a lowered hardness. However, the bearings of Examples 4 to 6 had fine carbide particles having a size of 55 nm, 125 nm and 285 nm secondarily deposited thereon, respectively. Accordingly, the bearings of Examples 4 to 6 exhibited a surface hardness HRC of as high as 57, 60 and 61, respectively, due to this secondary deposition effect. Further, since the bearings of Examples 4 to 6 had fine carbide particles uniformly and dispersedly deposited therein, the generation of eutectic carbide particles having a size of more than 5 μm was inhibited, and the average diameter of eutectic carbide particles was 2 μm or less. Further, the bearings of Examples 4 to 6 had a passive film uniformly formed thereon to a thickness of 5 nm, 15 nm and 20 nm, respectively. After life test, these bearings were each examined for conditions of race surface. As a result, these bearings showed good conditions. In the various tests, these bearings showed no flaking on the outer race even after 1,000 hours of life test. Further, the bearings of Examples 4 to 6 showed a retained austenite content (γR) of as small as 5%, 4% and 3%, respectively, as compared with those of Examples 1 to 3. This is presumably why the bearings of Examples 4 to 6 underwent no creeping.

TABLE 2

| | | Tempering temperature (° C.) | Surface hardness HRC | Diameter of eutectic carbide particles (μm) | γR (%) | Thickness of passive film (nm) | $L_{10}$ life (hr) | Breakage condition |
|---|---|---|---|---|---|---|---|---|
| Example No. | 1 | 180 | 62 | 2 or less | 10 | 7 | 849 | 5/10 creep |
| | 2 | 200 | 59 | 2 or less | 8 | 10 | 902 | 4/10 creep |
| | 3 | 220 | 57 | 4 or less | 7 | 98 | 933 | 3/10 creep |
| | 4 | 410 | 57 | 2 or less | 5 | 5 | 1000→ | No flaking |
| | 5 | 480 | 60 | 2 or less | 2 | 15 | 1000→ | No flaking |
| | 6 | 540 | 61 | 2 or less | 0.5 | 20 | 1000→ | No flaking |
| Comparative Example No. | 1 | 250 | 57 | 3 or less | 0.5 | 1 | 124 | 10/10 flaking on outer race |
| | 2 | 200 | 58 | 21 or more | 10 | 3 | 198 | 10/10 flaking on outer race |
| | 3 | 200 | 54 | 4 or less | 8 | 10 | 97 | 10/10 flaking on inner and outer races |
| | 4 | 200 | 59 | 6 or less | 7 | 8 | 304 | 10/10 flaking on outer race |
| | 5 | 450 | 60 | 8 or less | 5 | 5 | 238 | 10/10 flaking on outer race |
| | 6 | 450 | 61 | 24 or more | 4 | 51 | 224 | 10/10 flaking on inner and outer races |
| | 7 | 480 | 57 | 2 or less | 2 | 2 | 157 | 10/10 flaking on outer race |
| | 8 | 480 | 62 | 15 or more | 2 | 3 | 298 | 10/10 flaking on outer race |

As can be seen in Table 2, the bearings of Examples 1 to 3 exhibited a surface hardness HRC of 62, 59 and 57, respectively, and had a passive film formed uniformly thereon to a thickness of 7 nm, 10 nm and 98 nm, respectively. After life test, these bearings were observed for conditions of race surface. As a result, these bearings showed good surface conditions and no flaking on the outer race. Further, these bearings showed a far longer life than those of Comparative Examples 1 to 8. However, these bearings each underwent creeping on the inner race due to dimensional change accompanying the high temperature test. As a result, the bearings of Examples 1 to 3 showed $L_{10}$ life of 849 hours, 902 hours and 933 hours, respectively. The number of occurrence of creeping on the inner race was 5/10, 4/10 and 3/10 for Examples 1 to 3, respectively.

For Examples 4 to 6, the materials were each subjected to tempering at a temperature of as high as 400° C. to 550° C.

On the contrary, the bearing of Comparative Example 1 was prepared from ordinary SUJ2. The material was subjected to treatment for dimensional stabilization to have a retained austenite content (γR) of 2% and a bearing hardness HRC of 57. However, since the passive film had a thickness of as small as 1 nm, the bearing underwent flaking on the outer race at a ratio of 10/10 and showed $L_{10}$ life of 124 hours.

The bearing of Comparative Example 2 had coarse eutectic carbide particles having a size of 21 μm or more produced on the race surface in a large amount. Therefore, the passive film was not uniformly formed. Areas where a passive film having a thickness of 5 μm or more exists and areas where a passive film having a thickness of 5 μm or more doesn't exist were mixed. Thus, the average of the passive film was 3 nm. Accordingly, the bearing of Comparative Example 2 underwent flaking arising from whitening of structure and surface-starting flaking arising from eutectic carbide on the outer race at a ratio of 10/10 and showed a $L_{10}$ life of 198 hours.

The bearing of Comparative Example 3 had eutectic carbide particles having a diameter of 4 µm or less deposited thereon and a passive film formed thereon to a thickness of 10 nm. However, the bearing of comparative Example 3 had a C content of as low as 0.28% and thus exhibited a surface hardness HRC of as low as 54 after heat treatment. Thus, the bearing of Comparative Example 3 showed an accelerated plastic deformation due to rolling fatigue and hence underwent flaking on the outer race at a ratio of 10/10 and showed a $L_{10}$ life of 97 hours.

The bearing of Comparative Example 4 exhibited a hardness HRC of as sufficient as 59 and had a passive film formed thereon to a thickness of 8 nm. However, since the content of N in the surface of the bearing was as low as 0.02%, and the sum of the content of C and N was 0.45% or less, the passive film had a lowered strength. Thus, the passive film which had existed before the test was broken after the test. The bearing was then confirmed for presence of film by an XPS analyzer. As a result, a passive film having a thickness of 5 nm or less was observed in some places and no passive film was observed in other places. Accordingly, the bearing of Comparative Example 4 underwent flaking on the outer race at a ratio of 10/10 and showed a $L_{10}$ life of 304 hours.

The bearing of Comparative Example 5 exhibited a hardness HRC of as high as 60, had a passive film formed thereon to a thickness of 5 nm and contained C and N in a total amount of 0.55%. However, since the bearing of Comparative Example 5 contained no N incorporated therein, it exhibited a deteriorated abrasion resistance and thus was observed to have breakage in the passive film after the test. Accordingly, the bearing of Comparative Example 5 underwent flaking on the outer race at a ratio of 10/10 and showed a $L_{10}$ life of 238 hours.

The bearing of Comparative Example 6 exhibited a hardness HRC of as high as 61, had a passive film formed thereon to a thickness of as great as 51 nm and contained C and N in a total amount of 0.57%, demonstrating that the passive film had a sufficient strength. However, since the bearing of Comparative Example 6 contained Cr incorporated therein in an amount of 22.5%, it had eutectic carbide particles having a diameter of as great as 24 µm deposited thereon and thus underwent surface-starting flaking on the outer race at a ratio of 10/10 and showed a $L_{10}$ life of 224 hours.

The bearing of Comparative Example 7 exhibited a hardness HRC of 57, had eutectic carbide particles having a diameter of 3 µm or less deposited thereon and contained C and N in a sufficient total amount of 0.46%. However, since the bearing of Comparative Example 7 had a Cr content of as low as 7.3%, it had a passive film formed thereon to a thickness of as small as 2 nm. Accordingly, the resulting effect of adsorbing hydrogen atom by the passive film was lessened. Thus, the bearing of Comparative Example 7 underwent flaking on the outer race at a ratio of 10/10 and showed a $L_{10}$ life of 157 hours.

The bearing of Comparative Example 8 was prepared from SUS440C and had a surface hardness HRC of 62. However, since the bearing of Comparative Example 8 had a Cr content of as high as 1.08% and contained no N incorporated therein, the resulting passive film had a reduced strength. Further, since the bearing of Comparative Example 8 had eutectic carbide particles having a diameter of 15 µm deposited thereon, the resulting passive film had a thickness of 3 nm on the average. The bearing of Comparative Example 8 was then observed for conditions of race surface after test. As a result, the passive film disappeared completely as surface contact proceeded. Accordingly, the bearing of Comparative Example 8 underwent flaking on the outer race at a ratio of 10/10 and showed a $L_{10}$ life of 298 hours.

The foregoing embodiment of implication of the present invention has been described with reference to the case where both the inner and outer races are prepared from the material according to the present invention. However, taking into account the cost, it is preferred that only the outer race, which is liable to frequent occurrence of flaking, be prepared from the material according to the present invention while the inner race and rolling elements be prepared from ordinary bearing steel.

Under the circumstances where a pilot pressure is applied to the bearing so that rolling elements rotate on an axis at a contact angle, it is preferred that at least the rolling elements be prepared from the material of the invention if the rolling elements have a shortened fatigue life than the inner and outer races because they run along only one band and thus can easily rotate.

The second embodiment of implication of the present invention will be described hereinafter.

For the life test on the rolling bearings of Examples 11 to 13 and Comparative Examples 11 to 13, the inner races and outer races were prepared from the materials set forth in Table 3.

TABLE 3

|  |  | C | Cr | N | C + N | Si | MN | Mo | V |  |
|---|---|---|---|---|---|---|---|---|---|---|
| Example No. | 11 | 0.55 | 14.0 | 0.10 | 0.65 | 0.25 | 0.51 | — | — |  |
|  | 12 | 0.43 | 12.5 | 0.02 | 0.45 | 0.65 | 0.33 | — | — |  |
|  | 13 | 0.35 | 12.0 | 0.20 | 0.55 | 0.31 | 0.45 | 0.10 | 0.10 |  |
| Comparative | 11 | 1.05 | 1.5 | — | 1.15 | 0.35 | 0.38 | — | — | SUJ2 |
| Example No. | 12 | 1.00 | 17.0 | — | 1.10 | 0.38 | 0.42 | — | — | SUS440C |
|  | 13 | 0.48 | 5.3 | — | 0.6 | 0.21 | 0.31 | 0.25 | — | JP-A-5-26244 |

For the bearing races other than that of Comparative Example 11, the materials were each subjected to ordinary heat treatment, i.e., thermal hardening at a temperature of from 1,000° C. to 1,150° C., sub-zero treatment, and then tempering at a temperature of 160° C. For the bearing race of Comparative Example 11, the material, which is SUJ2, was subjected to thermal hardening at a temperature of 850° C. and then tempering at a temperature of 180° C. to have a surface hardness HRC of from 58 to 64, a surface roughness of from 0.01 to 0.04 µmRa and a retained austenite (γR) content of from 6 to 12%.

For all the rolling elements of Examples 11 to 13 and Comparative Examples 11 to 13, SUJ2 was used. In some detail, the material was subjected to ordinary heat treatment, i.e., thermal hardening at a temperature of 850° C., oil quenching and then tempering at a temperature of 160° C. to have a surface hardness HRC of from 61, a surface roughness of from 0.003 to 0.010 μmRa and a retained austenite (γR) content of 10% or less.

As the filling greases there were used greases A to E set forth in Table 4. For the comparison of properties, these greases each contained as additives a thickening agent and an oxidation inhibitor incorporated therein in an amount of 20% and 2%, respectively. The charged amount of grease was 40% by volume of the space in the bearing. By predetermining the viscosity of the base oil set forth in Table 4 to 20 mm$^2$/sec at 100° C., the driving torque can be reduced to advantage. By predetermining the viscosity of the base oil to 5 mm$^2$/sec or more at 100° C., a lubricant film can be formed, making it possible to inhibit seizing.

TABLE 4

|   | Proportion of ether oil in base oil (ester oil + ether oil) | Viscosity of base oil (100° C.) [mm$^2$/sec] | Thickening agent |
|---|---|---|---|
| A | 100% | 16 | Urea |
| B | 70% | 13 | Urea |
| C | 50% | 9 | Urea |
| D | 40% | 8 | Urea |
| E | 50% | 13 | Lithium |

In general, the base oil for grease is roughly divided into two groups, i.e., mineral oil and synthetic oil. The synthetic oil, which is excellent in thermal stability, exhibits good properties at high temperatures. However, under the circumstances where a high vibration is applied to the bearing, an alkyldiphenylether oil having an ether bond or the like is preferred to a synthetic hydrocarbon such as poly α-olefin or polyolester among these synthetic oils to provide a good thermal stability and hydrolyzability and render the grease structure little liable to change.

The results of the life test on the rolling bearings of Examples 11 to 13 and Comparative Examples 11 to 13 will be given hereinafter.

As the testing machine there was used a bench rapid acceleration-deceleration testing machine which operates at a rotary speed that switches between 9,000 rpm and 18,000 rpm at a predetermined time interval (e.g., 9 seconds). For both the examples and comparative examples, the test bearing was prepared from JIS Model No. 6303. Referring to load conditions, P (load)/C (dynamic rated load) was 0.10. For the life test, two kinds of tests, i.e., Test 1 and Test 2 were conducted.

Test 1 was conducted on 6 kinds of bearings of Examples 11 to 13 and Comparative Examples 11 to 13 set forth in Table 3 with the grease C having an ether oil proportion of 50% in a base oil (ester oil and ether oil) set forth in Table 4.

Referring to the test environment, the humidity was constant at 80° C. and the temperature of the atmosphere as testing temperature was constant at 100° C., assuming that the working atmosphere has a high temperature and humidity. The calculated lifetime of the bearing was 1,350 hours. Accordingly, the life test was terminated at 1,000 hours. Ten samples were tested for each of the examples and comparative examples (n=10).

Test 2 was conducted on the bearing of Example 11 set forth in Table 3 with the greases A to E set forth in Table 4. Referring to the test environment, the greases each contained water incorporated therein in an amount of 5%, and the temperature of the atmosphere as testing temperature was constant at 50° C. The calculated lifetime of the bearing was 1,350 hours. Accordingly, the life test was terminated at 1,000 hours. Ten samples were tested for each of the examples and comparative examples (n=10).

Table 5 shows the results of Test 1. The thickness of passive film set forth in Table 5 indicates the average thickness of passive film. Where eutectic carbide particles having a greater diameter are deposited, the formation of passive film is inhibited, accordingly reducing the average thickness of passive film.

TABLE 5

|   |   | Surface hardness [HRC] | Diameter of eutectic carbide particles [μm] | Thickness of passive film [nm] | $L_{10}$ life [hr] | Breakage conditions |
|---|---|---|---|---|---|---|
| Example No. | 11 | 64 | 2 or less | 35 | 1000→ | No flaking |
|  | 12 | 61 | 2 or less | 25 | 1000→ | No flaking |
|  | 13 | 58 | 2 or less | 20 | 1000→ | No flaking |
| Comparative Example No. | 11 | 62 | 3 or less | 1 | 71 | 10/10 flaking on outer race |
|  | 12 | 63 | 22 or more | 4 | 101 | 10/10 flaking on outer race |
|  | 13 | 58 | 4 or less | 3 | 68 | 10/10 flaking on outer race |

As can be seen in Table 5, the bearings of Examples 11 to 13 exhibited a surface hardness HRC of as high as 64, 61 and 58, respectively, and had eutectic carbide particles having a diameter of 2 μm or less deposited thereon and a passive film formed thereon to a uniform thickness of 35 nm, 25 nm and 20 nm, respectively. After life test, these bearings were observed for conditions of race surface. As a result, these bearings showed good conditions and underwent no flaking on the outer race.

On the other hand, Comparative Example 11 was a test made on ordinary SUJ2. The bearing of Comparative Example 11 exhibited a surface hardness HRC of 62. However, since the bearing of Comparative Example 11 had a passive film formed thereon to a thickness of as small as 1 nm, it underwent flaking on the outer race at a ratio of 10/10 and showed a $L_{10}$ life of 71 hours. The bearing of Comparative Example 12 had a large amount of coarse eutectic carbide particles having a size of 22 µm or more produced on the race surface. Therefore, the passive film was not uniformly formed. Areas where a passive film having a thickness of 5 µm or more exists and areas where a passive film having a thickness of 5 µm or more doesn't exist were mixed. Thus, the average of the passive film was 4 nm. Accordingly, the bearing of Comparative Example 11 underwent flaking arising from whitening of structure and surface starting flaking arising from eutectic carbide on the outer race at a ratio of 10/10 and showed a $L_{10}$ life of 101 hours. The bearing of Comparative Example 13 had eutectic carbide particles having a diameter of 4 µm or less deposited thereon. However, the bearing of Comparative Example 13 had a small Cr content and a passive film having a thickness of 3 nm formed thereon. Accordingly, when subjected to test under high temperature and humidity conditions, the interior of the bearing was contaminated with water produced by dew condensation, making grease lubrication difficult. As a result, the bearing of Comparative Example 13 underwent flaking on the outer race at a ratio of 10/10 and showed a $L_{10}$ life of 68 hours.

The results of Test 2 are set forth in Table 6.

TABLE 6

|  | $L_{10}$ life [hr] | Occurrence of flaking |
| --- | --- | --- |
| Example 11A | 1000→ | No flaking |
| Example 11B | 1000→ | No flaking |
| Example 11C | 912 | 2/10 flaking on outer race |
| Comparative Example 11D | 453 | 2/10 flaking on outer race |
| Comparative Example 11E | 435 | 3/10 flaking on outer race |

As can be seen in Table 6, Examples 11A and 11B were tests made with a grease comprising an ether oil and a urea-based thickening agent incorporated therein in an amount of 100% and 70%, respectively. Therefore, even when lubricated with a grease mixed with 5% of water, the metallic contact of the race surface with the rolling elements was lessened, inhibiting the destruction of the passive film on the bearing races. Accordingly, the bearings of Examples 11A and 11B were observed to have good race conditions after test and underwent no flaking on the outer race even after 1,000 hours of life test.

Example 11C was a test made with a grease comprising a urea-based thickening agent containing 50% of an ether oil incorporated therein. Therefore, under lubrication with a grease mixed with 5% of water, metallic contact occurred easily. Accordingly, the bearing of Example 11C underwent flaking on the outer race at a ratio of 2/10 and showed a $L_{10}$ life of 912 hours, which is twice that of Comparative Examples 11D and 11E described later.

On the other hand, Comparative Example 11D was a test made with a grease comprising a urea-based thickening agent containing 40% of an ether oil incorporated therein. Therefore, under lubrication with a grease mixed with 5% of water, local metallic contact occurred frequently, deteriorating the roughness of the race surface in the vicinity of the maximum load zone to 0.09 µmRa. As a result, the passive film having a thickness of 35 nm was locally observed to have been destroyed. Accordingly, the bearing of Comparative Example 11D underwent flaking on the outer race at a ratio of 2/10 and showed a $L_{10}$ life of 453 hours.

Comparative Example 11E was a test made with a grease comprising a lithium soap-based thickening agent containing 50% of an ether oil incorporated therein. Therefore, under high vibration conditions, this grease has a lower damping effect than the grease comprising a urea-based thickening agent. This is because the crystal structure of lithium soap undergoes phase transition that results in softening under high vibration conditions. Accordingly, even when the grease comprises as a base oil an ether oil incorporated therein in an amount of as sufficient as 50%, metallic contact can easily occur, causing water, which contaminates the grease in an amount of 5%, to decompose to hydrogen that is then adsorbed by the race surface and hence can be easily accumulated on the maximum shear stress positions. As a result, the bearing of Comparative Example 11E, despite the passive film thickness of 35 nm, underwent flaking on the outer race at a ratio of 3/10 and showed a $L_{10}$ life of 435 hours, which is the shortest among the bearings of the examples and comparative examples.

The foregoing embodiment of implication of the present invention has been described with reference to the case where both the inner and outer races are prepared from the material according to the present invention. However, taking into account the cost, it is preferred that only the outer race, which is liable to frequent occurrence of flaking, be prepared from the material according to the present invention while the inner race and rolling elements be prepared from ordinary bearing steel.

Further, by dipping the bearing prepared from the material according to the claim of the invention in a nitric acid solution so that it is personated, a passive film can be formed thereon to a thickness of from 100 to 2,000 nm, making it possible to provide a bearing having an even longer life.

The foregoing embodiment of implication of the present invention has been described with reference to the case where a ball bearing is tested. However, the present invention can exert a better effect on roller bearing and needle bearing, which have a greater race surface roughness and hence a worse lubricant film-forming capacity than ball bearing, because it can give solution to difficulty in the formation of lubricant film when slippage such as skewing can easily occur.

As obvious from the foregoing description, the present invention makes it possible to form a uniform passive film having an excellent abrasion resistance on the race surface, exerting an effect of fairly preventing early flaking even under severe conditions such as high temperature and vibration and contamination with water and hence drastically prolonging the life of the rolling bearing.

In this case, by filling the bearing space with a urea-based grease made of a synthetic oil comprising as a base oil an ether incorporated therein in an amount of 50% or more, the bearing can be kept fairly lubricated even under high vibration conditions, making it possible to inhibit the decomposition of water in the grease and exert a high damping effect. Accordingly, the passive film on the race surface can be fairly protected, making it possible to further prolong the rolling life.

What is claimed is:

1. A rolling bearing comprising a fixed race, a rotary race and a plurality of rolling elements disposed between said fixed race and said rotary race;

wherein at least said fixed race is made of a steel comprising from 0.35 to 0.55% by weight of C, from 11.0 to 17.0% by weight of Cr, from 0.05 to less than 0.22 by weight of N and the rest of Fe and unavoidable components, further wherein the sum of the content of C and N is from 0.45 to 0.65% by weight or less, and exhibits a surface hardness HRC of 57 or more after heat treatment and the diameter of eutectic carbide produced at least on said bearing rolling surface of the races is 10 μm or less, wherein said steel further comprises at least one of 3.0% by weight or less of Mo and 2.0% by weight or less of V, and wherein a thickness of a passive film is from 5 nm to 100 nm at least on said bearing rolling surface of the races.

2. The rolling bearing according to claim 1, wherein the content of Cr in said steel is from 11.0 to 14.0% by weight.

3. The rolling bearing according to claim 1, wherein a retained austenite content of at least the race surface is 10% or less.

4. The rolling bearing according to claim 1, wherein fine carbide particles having a size of from 50 to 300 nm is uniformly dispersed on a rolling surface of the race.

5. The rolling bearing according to claim 1, wherein a space in the bearing is filled with a grease made of a synthetic oil comprising 50% or more of ether oil as a base oil and urea-based thickening agent.

6. The rolling bearing according to claim 5, wherein a viscosity of said base oil is from 5 to 20 mm$^2$/sec at 100° C.

7. The rolling bearing according to claim 2, wherein fine carbide particles having a size of from 50 to 300 nm is uniformly dispersed on a rolling surface of the race.

8. The rolling bearing according to claim 2, wherein a space in the bearing is filled with a grease made of a synthetic oil comprising 50% or more of ether oil as a base oil and urea-based thickening agent.

9. The rolling bearing according to claim 4, wherein a space in the bearing is filled with a grease made of a synthetic oil comprising 50% or more of ether oil as a base oil and urea-based thickening agent.

10. The rolling bearing according to claim 8, wherein a viscosity of said base oil is from 5 to 20 mm$^2$/sec at 100° C.

\* \* \* \* \*